US010606502B2

(12) United States Patent
P Gopi

(10) Patent No.: US 10,606,502 B2
(45) Date of Patent: Mar. 31, 2020

(54) DATA AGING INFRASTRUCTURE FOR AUTOMATICALLY DETERMINING AGING TEMPERATURE

(71) Applicant: SAP SE, Walldorf (DE)

(72) Inventor: Ajalesh P Gopi, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/641,325

(22) Filed: Jul. 5, 2017

(65) Prior Publication Data

US 2019/0012107 A1 Jan. 10, 2019

(51) Int. Cl.
| G06F 16/22 | (2019.01) |
| G06F 16/24 | (2019.01) |
| G06F 3/06 | (2006.01) |
| G06F 17/30 | (2006.01) |
| G06F 16/23 | (2019.01) |
| G06F 16/2455 | (2019.01) |

(52) U.S. Cl.
CPC .......... *G06F 3/0647* (2013.01); *G06F 3/0611* (2013.01); *G06F 3/0685* (2013.01); *G06F 16/2282* (2019.01); *G06F 16/2379* (2019.01); *G06F 16/24552* (2019.01); *G06F 16/24565* (2019.01); *G06F 17/3051* (2013.01); *G06F 17/30339* (2013.01); *G06F 17/30377* (2013.01)

(58) Field of Classification Search
None
See application file for complete search history.

(56) References Cited

U.S. PATENT DOCUMENTS

| 6,442,543 B1* | 8/2002 | Snodgrass ......... G06F 17/30551 |
| 8,918,388 B1* | 12/2014 | Chen ................. G06F 17/30592 |
| | | 707/714 |
| 2005/0289174 A1* | 12/2005 | Kolli ................. G06F 17/30566 |
| 2006/0004707 A1* | 1/2006 | Dettinger .......... G06F 17/30395 |
| 2007/0083522 A1* | 4/2007 | Nord ........................ G06F 16/10 |
| 2011/0093905 A1* | 4/2011 | McKinley .......... H04N 7/17336 |
| | | 725/92 |
| 2014/0181134 A1* | 6/2014 | Hermanns ........... G06F 21/6227 |
| | | 707/759 |
| 2014/0201225 A1* | 7/2014 | Deshmukh ........ G06F 17/30286 |
| | | 707/758 |
| 2015/0074087 A1* | 3/2015 | Zaragoza .......... G06F 17/30867 |
| | | 707/722 |
| 2015/0186047 A1* | 7/2015 | Shank ................... G06F 3/0655 |
| | | 711/103 |
| 2015/0356170 A1* | 12/2015 | Allen ................ G06F 17/30654 |
| | | 707/725 |

(Continued)

*Primary Examiner* — Sean D Rossiter
*Assistant Examiner* — Stephanie Wu
(74) *Attorney, Agent, or Firm* — Fish & Richardson P.C.

(57) ABSTRACT

A query is received in a session established between an application and an in-memory database. The query is received from the application. Based on one or more criteria defined for individual data aging parameters in the data aging infrastructure, an aging temperature to be applied to the query is determined. The determined aging temperature is received at the application. The aging temperature is automatically set in the session before executing the query in the in-memory database. Based on the determined aging temperature, a partition is loaded from a secondary memory to a main memory. With the aging temperature as reference, the query is executed to fetch a result from the in-memory database.

15 Claims, 6 Drawing Sheets

(56) References Cited

U.S. PATENT DOCUMENTS

2017/0214705 A1* 7/2017 Gupta ............... G06F 17/30522
2017/0228460 A1* 8/2017 Amel ................ G06F 17/30864
2017/0344646 A1* 11/2017 Antonopoulos .. G06F 17/30867

* cited by examiner

| | SALESORDER_ID 102 | CUSTOMER 104 | CREATED DATE 106 | GROSS AMOUNT 108 | CURRENCY 110 | OVERALL STATUS 112 | DELIVERY STATUS 114 | PAYMENT DATE 116 | TAX AMOUNT 118 | DATA AGING 120 |
|---|---|---|---|---|---|---|---|---|---|---|
| 122 | 1001 | CUST_01 | 10.01.2013 | 1000 | INR | CLOSED | DELIVERED | 15.01.2013 | 10 | 15.01.2013 |
| 124 | 1002 | CUST_02 | 30.04.2014 | 100 | INR | CLOSED | DELIVERED | 10.05.2014 | 7 | 10.05.2014 |
| 126 | 1003 | CUST_03 | 03.06.2016 | 4500 | INR | CLOSED | DELIVERED | 10.06.2016 | 30 | — |
| 128 | 1004 | CUST_01 | 01.05.2017 | 13000 | INR | CLOSED | DELIVERED | 13.05.2017 | 100 | — |
| 130 | 1005 | CUST_02 | 10.05.2017 | 12782 | INR | OPEN | NOT DELIVERED | — | 90 | — |
| 132 | 1006 | CUST_01 | 15.05.2017 | 30900 | INR | OPEN | DELIVERED | 21.05.2017 | 120 | — |

DATA AGING INFRASTRUCTURE FOR AUTOMATICALLY DETERMINING AGING TEMPERATURE

FIELD

Illustrated embodiments generally relate to data processing, and more particularly data aging infrastructure for automatically determining aging temperature.

BACKGROUND

In data management applications, data aging process involves temporarily storing frequently accessed data in volatile memory where the data can be accessed for processing, and moving less frequently used data from the volatile memory to a non-volatile memory. While accessing data from an application program, typically data stored in the volatile memory is accessed. However, in some situations, when there is a need to access the less frequently used data stored in the non-volatile memory, performance of the application program may be affected, e.g., when the volume of data to be accessed in the non-volatile memory is high. Further, it may be challenging for the application program to identify a relevant memory partition in the non-volatile memory that includes the data to be accessed.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 1 shows a table illustrating exemplary sales order table, according to one embodiment.

DETAILED DESCRIPTION

Figure 2:
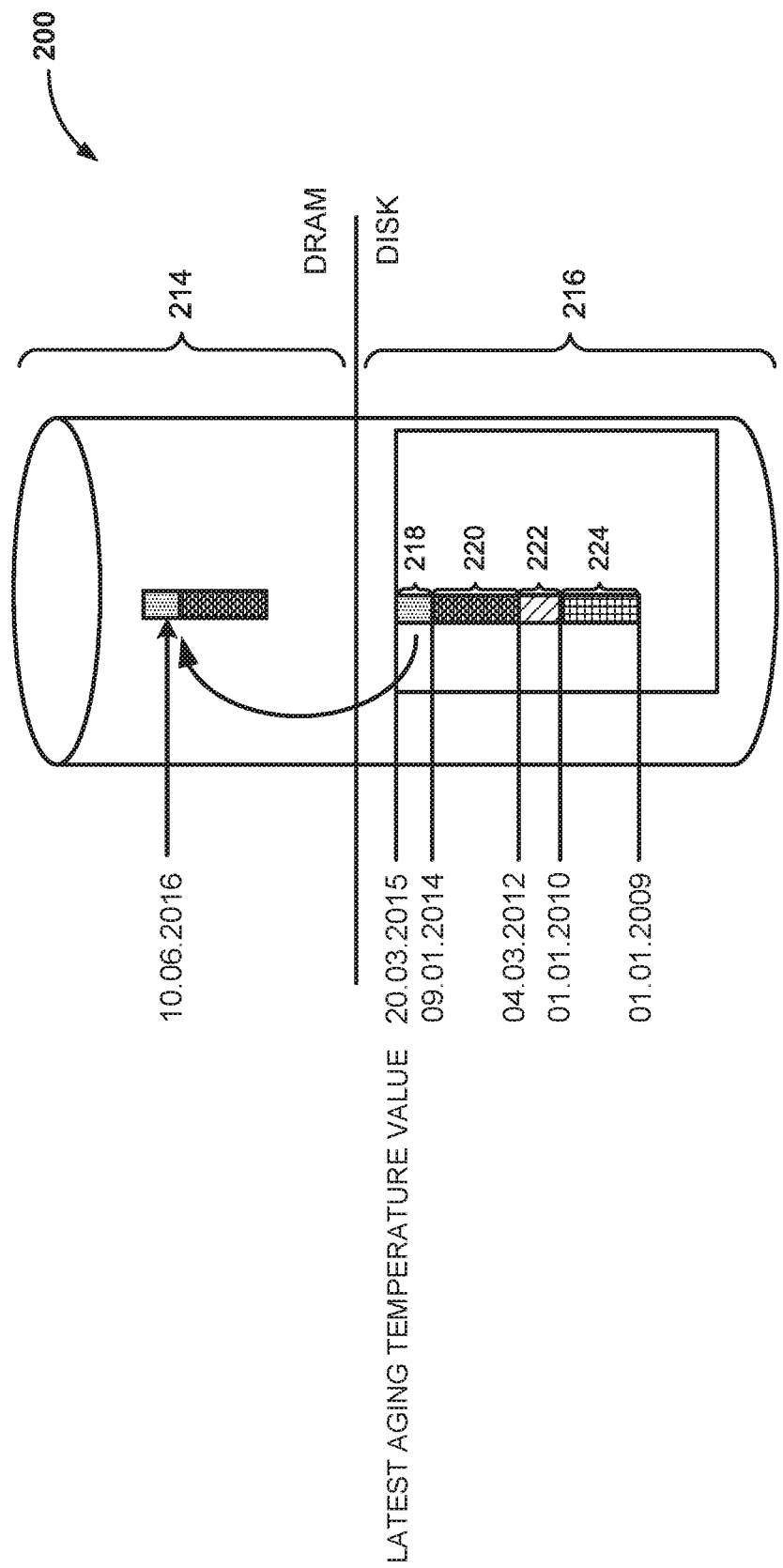
FIG. 2 is a block diagram illustrating data aging, according to one embodiment.

Embodiments of techniques of data aging infrastructure for automatically determining aging temperature are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

FIG. 1 shows table 100 illustrating exemplary sales order table, according to one embodiment. Table 100 is a sales order table with sales information corresponding to orders. Sales order table has fields such as sales order_ID 102, customer 104, created date 106, gross amount 108, currency 110, overall status 112, delivery status 114, payment date 116, tax amount 118 and data aging 120. Sales order_ID 102 represents a unique ID associated with a sales order, customer 104 represents an entity/person for whom the sales order was created, created date 106 represents a date on which the sales order was created, gross amount 108 represents a gross amount for the particular sales order, currency 110 represents a currency in which payment was made, overall_status 112 represents a status of the sales order, delivery status 114 represents whether the sales order has been delivered or not, payment date 116 represents the date on which the payment was made, tax amount 118 represents the government tax amount, and data aging 120 represents a reference date indicating that data aging is performed for that particular sales order_ID or record. Sales data corresponding to various fields of the sales order table are shown in rows 122 to 132. Although the example described above in the form of sales data is used to illustrate various features, one of ordinary skill in the art would understand that the described features are just as applicable to other data aging applications in such diverse fields as science, education, government, technology, social sciences, biological sciences, etc.

FIG. 2 is block diagram 200 illustrating data aging, according to one embodiment. In-memory database may be executed using multi-core CPU's with quick processing between the processor cores, and contains terabytes of main memory or random access memory (RAM) referred to as volatile memory. In the in-memory database, memory organization is linear. In a linear memory organization, data may be stored as a row store or a column store. In enterprise data management, operationally relevant data referred to as current data or hot data are stored in a dynamic random access memory (DRAM) or main memory that is a volatile memory. Other data such as operationally non-relevant data are stored in auxiliary memory or secondary memory that is a non-volatile memory. A data aging object also referred to as aging object may define database tables that should be aged together, so that relevant data records of the aging object are aged together. In data aging, data aging temperature specifies to which database area the data may be assigned.

Section 214 represents the in-memory database storage, where a dynamic random access memory (DRAM) is used for storage. DRAM is a volatile memory that requires power to maintain the stored information. Data stored in the storage area of DRAM or main memory is referred to as current data or hot data. Section 216 represents an auxiliary memory or secondary memory that is a non-volatile memory. Some examples of secondary memory are flash memory, optical disc, magnetic disk, etc. Data stored in the storage area of secondary memory are referred to as historical data or cold data. Accessing data stored in secondary memory is relatively slower compared to data stored in main memory.

Based on data aging concept less frequently used data is moved from section 214 to section 216. Data is moved from main memory to the secondary memory, and the secondary memory to the main memory in the form of partitions. In the secondary memory, section 218 between aging temperature 20.03.2015 and 09.01.2014 represents partition A. Section 220 between aging temperature 09.01.2014 and 04.03.2012 represents partition B, and section 222 between aging temperature 04.03.2012 and 01.01.2010 represents partition C, and similarly section 224 represents partition D. Maximum aging temperature is 20.03.2015 beyond which data aging is not performed and the data is available in volatile memory or main memory corresponding to section 214. If partition B 220 is required to be moved to section 214, the aging temperature 04.03.2012 is provided as input. The aging temperature 04.03.2012 is used as a reference aging temperature to move partition B from section 216 to section 214. Similarly, if partition C 222 is required to be moved to section 214, the aging temperature 01.01.2010 is provided as input. In one embodiment, if the in-memory database is configured to move partitions in a top-down approach, the aging temperature 04.03.2012 is used as a reference aging temperature to move partition B and partition A from section 216 to section 214. Based on the configuration of the in-memory database, the partitions are moved from section 216 to section 214. In case the aging temperature provided lies in between a partition, the nearest aging temperature date is determined as a reference aging temperature and the corresponding partition is moved from the section 216 to the section 214. For example, if the aging temperature provided as input is 04.05.2012, the nearest aging temperature is determined as 04.03.2012 reference aging temperature, and the corresponding partition 220 is moved from the section 216 to the section 214.

Data aging may be performed on table 100 in FIG. 1 based on certain criteria. For example, records in overall status 'closed', and delivery status 'delivered' and are at least 180 days old could be archived or stored in the non-volatile memory section. Various columns in the table 100 may be selected for defining aging criteria. The column payment date 116 in table 100 may be selected for defining the aging criteria. Therefore, when data aging is performed on a record in table 100, payment date is indicated in the field associated with data aging 120. For example, record 122 associated with sales order_ID 1001 meets the criteria overall status 'closed', delivery status 'delivered' and is 180 days old, therefore, data aging has reference date i.e. payment date 15.01.2013 indicating that data aging is performed on the record 122. The record 122 may be found in partition B section 220 since payment date 15.01.2013 is within section 220 with starting aging temperature 04.03.2012. Similarly, data aging is performed on record associated with sales order_ID 1002. Records associated with sales order_ID 1003 and 1004 are not aged because they do not meet the criteria of being 180 days old. Records associated with sales order_ID 1005 and 1006 are not aged because the overall status is 'open', delivery status is 'not delivered', and payment date 116 does not indicate that the records are 180 or more days old.

Figure 3:
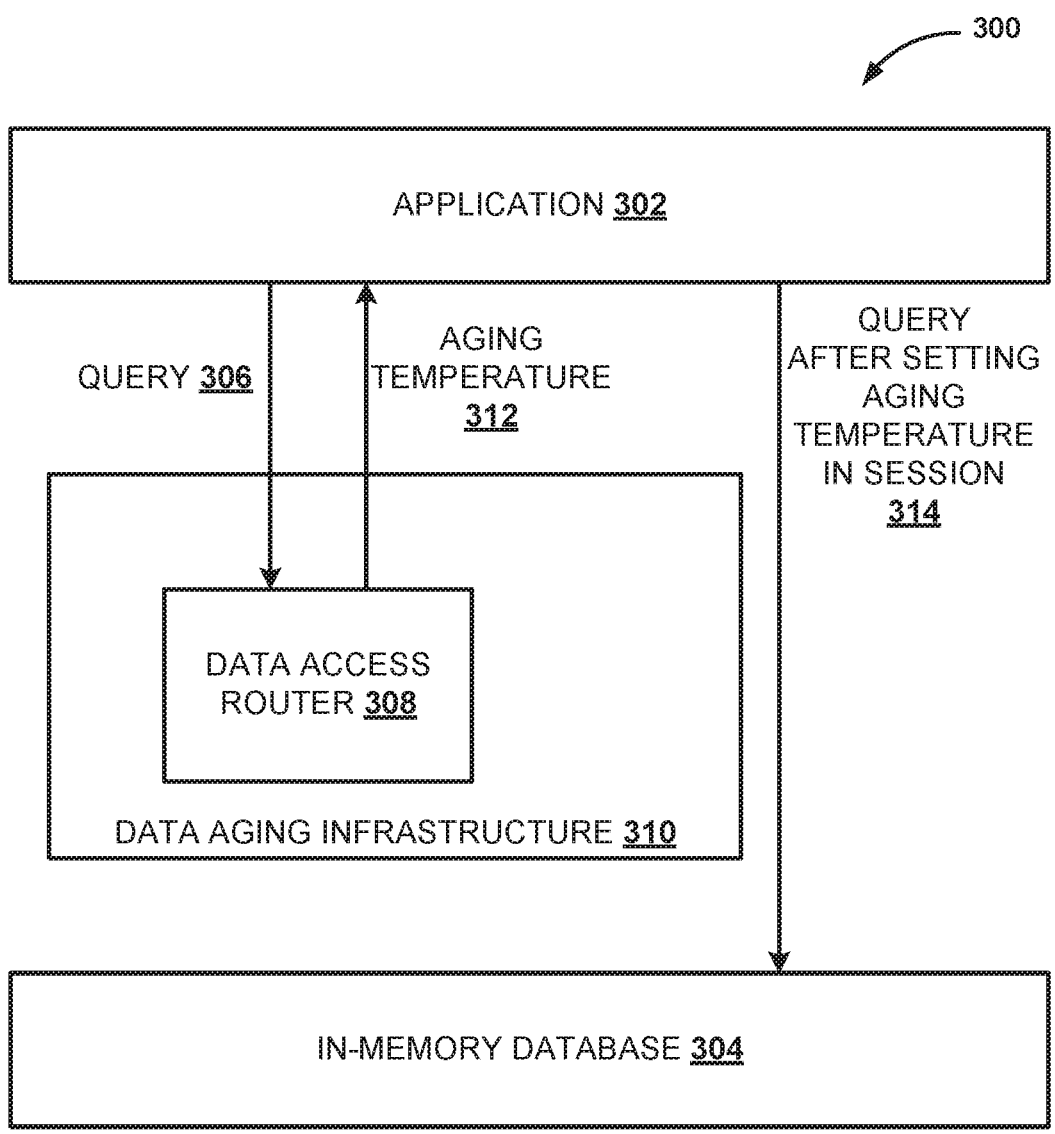
FIG. 3 is a block diagram of architecture of data aging, according to one embodiment.

FIG. 3 is block diagram 300 of architecture of data aging, according to one embodiment. A session referred to as database session is established between an application 302 and an in-memory database 304. Query 306 is received from the session established between the application 302 and the in-memory database 304. The query 306 may be in structured query language (SQL) or any other programing language. For example, the query may be:

SELECT sales order_ID, customer, gross amount, currency FROM sales order WHERE payment date>10.01.2015 (Q1)

The query Q1 306 is received at data access router 308 in data aging infrastructure 310. The data access router 308 is a module that uses various data aging parameters and logic to determine aging temperature. The data aging infrastructure 310 includes the data access router and various data aging parameters such as aging active parameter, aging statistics parameter, aging reference parameter, and aging rule parameter that helps in determining the aging temperature automatically for a query. For example, the aging active parameter helps determining whether the table specified in the query Q3 is associated with an aging object. Statistics information of a data aging run or execution is stored in the aging statistics parameter. The aging reference parameter defines fields in the table that determine the aging criteria. The data access router 308 receives conditional clauses such as payment date>10.01.2015 specified in the query Q1 306. Based on the received query Q1 306, the data access router 308 dynamically determines aging temperature 312, and sends the aging temperature 312 to the application 302. The determined aging temperature 312 is automatically set or provided as input in the session before executing the query Q1 306 in the in-memory database 304. After setting the aging temperature 312 in the session, the query Q1 306 will be sent 314 to the in-memory database 304 for execution. In response to the received query Q1 306, relevant partitions from a secondary memory are loaded into a main memory in the in-memory database 304 for execution of the query Q1 306.

When a query as shown below is received at the data access router 308:

SELECT sales order_ID, customer, gross amount, currency FROM sales order WHERE overall status='Open' (Q2)

The query Q2 is received at data access router 308 in the data aging infrastructure 310. The data access router 308 receives the conditional clauses such as overall status='open' as specified in the query Q2. Based on the received query Q2, the data access router 308 dynamically determines an aging temperature. Since the conditional clause overall status is 'open', the data access router 308 determines that the record associated with this conditional clause is available in the main memory. Hence, the data access router 308 dynamically determines that the records are available in main memory, and an aging temperature "00.00.0000" is sent to the application 302. The aging temperature "00.00.0000" is defined or associated with main memory. The query Q2 will be executed in the in-memory database 304, which will ensure that relevant records are retrieved from the main memory.

Figure 4:
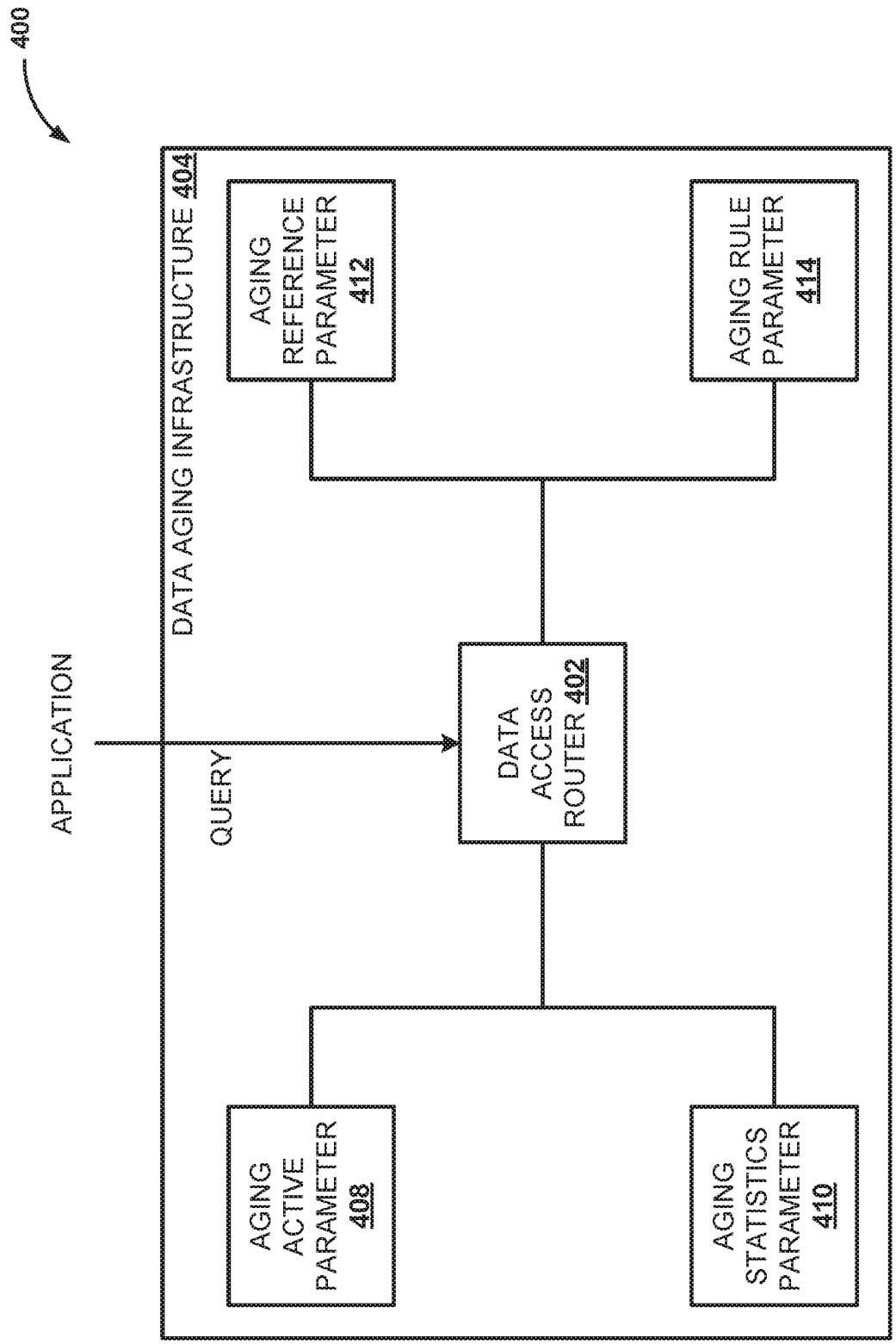
FIG. 4 is a block diagram of data aging infrastructure, according to one embodiment.

FIG. 4 is block diagram 400 of data aging infrastructure, according to one embodiment. A session is established between an application and an in-memory database. When a user issues a query in the session from the application, data access router 402 receives the query and determines an aging temperature to be applied for the query. For example, the query received from the application may be:

SELECT sales order_ID, customer, gross amount, currency FROM sales order WHERE overall status='closed' AND delivery status='delivered' AND payment date>10.02.2014 (Q3)

The data aging infrastructure 404 has various data aging parameters such as aging active parameter 408, aging statistics parameter 410, aging reference parameter 412, and aging rule parameter 414. The parameters such as aging active parameter 408, aging statistics parameter 410, aging reference parameter 412, and aging rule parameter 414 in the data aging infrastructure 404 enable the data access router 402 to determine the aging temperature for the received query Q3. Individual criteria or a combination of criteria may be configured for the individual parameters. The individual criteria configured for the individual parameters are applied on the received query Q3, and the aging temperature for the query Q3 is determined.

Aging active parameter 408 helps determining whether the table specified in the query Q3 is associated with an aging object. If the aging object is associated with the table, it is inferred that the table has cold data in auxiliary memory or secondary memory. For example, the aging active parameter 408 determines that sales order table 100 in FIG. 1 has data aging object defined. Statistics information of a data aging run or execution is stored in the aging statistics parameter 410. When data aging is performed on the table (e.g., 100), statistics information such as number of records processed, size of the processed records, latest aging temperature, etc., are recorded or stored in the aging statistics parameter 410. For example, when data aging is performed on the sales order table, aging statistics parameter 410 stores the number of records processed as '543' (not shown), the size of the processed records as '4.6 GB' (not shown), the latest aging temperature as '20.03.2015' (not shown). Aging reference parameter 412 defines fields that determine the data aging criteria. A user may define the fields of the table that determine the aging criteria. For example, the user may define the conditional clause for e.g., payment date as the data aging criteria based on which data aging is performed for the sales order table. Aging rile parameter 414 defines one or more other conditional clauses, criteria and/or rules that help in determining the aging temperature. For example, the other criteria as shown below may be defined in the aging rule parameter 414:

```
IF overall status='open' THEN aging
    temperature='00.00.0000'

ELSE

IF overall status='closed' THEN aging
    temperature='09.01.2014'

IF delivery status='not delivered' THEN aging
    temperature='00.00.0000'

ELSE

IF delivery status='delivered' THEN aging
    temperature='09.01.2014'
```

When the query Q3 is received from the application at the data access router 402, the aging active parameter 408 determines that the sales order table specified in query Q3 has the data aging object defined. The aging statistics parameter 410 stores the number of records processed as '543' (not shown), the size of the processed records as '4.6 GB' (not shown) and the latest aging temperature as '20.03.2015' (not shown). Aging reference parameter 412 defines payment date field as the data aging criteria. The received query Q3 has a conditional clause payment date>10.02.2014, and hence the payment date '10.02.2014' is used as reference date for determining the aging temperature. The conditional clause of the query Q3 is matched with the criteria defined in the aging rule info 414. The conditional clause of the query Q3 is "overall status='closed' AND delivery status='delivered' AND payment date>10.02.2014". Based on matching the conditional clause of the query Q3 with the criteria defined in aging rule parameter 414, it is determined that the aging temperature is '09.01.2014'. The determined aging temperature '09.01.2014' is provided to the application. The determined aging temperature is automatically set in the session before initiating the query Q3 to be processed in the in-memory database. Since the determined aging temperature '09.01.2014' is available in the cold storage or secondary storage, a partition corresponding to the aging temperature '09.01.2014' is loaded into DRAM or main memory in section 214. The query Q3 is executed to fetch a result from the main memory in the in-memory database. Another exemplary environment for the data aging infrastructure to automatically determine aging temperature is in medical domain. Medical institutes and hospitals store electronic health records of patients. The electronic health records of patients may include various fields such as patient name, patient ID, medical histories, medications, immunization date, blood group, allergies, lab test results, radiology images, annual health check date, etc. For example, the medical institute may choose to identify patients with annual health check date greater than one year, and send a notification or message reminding the patients of their annual health check for the current year. The query to retrieve patient information may include a conditional clause such as annual health check date greater than one year (for e.g. 10.04.2016). An aging temperature is determined at the data aging infrastructure, and the aging temperature is applied in the electronic health records of patients stored in the secondary memory to fetch the required results.

Figure 5:
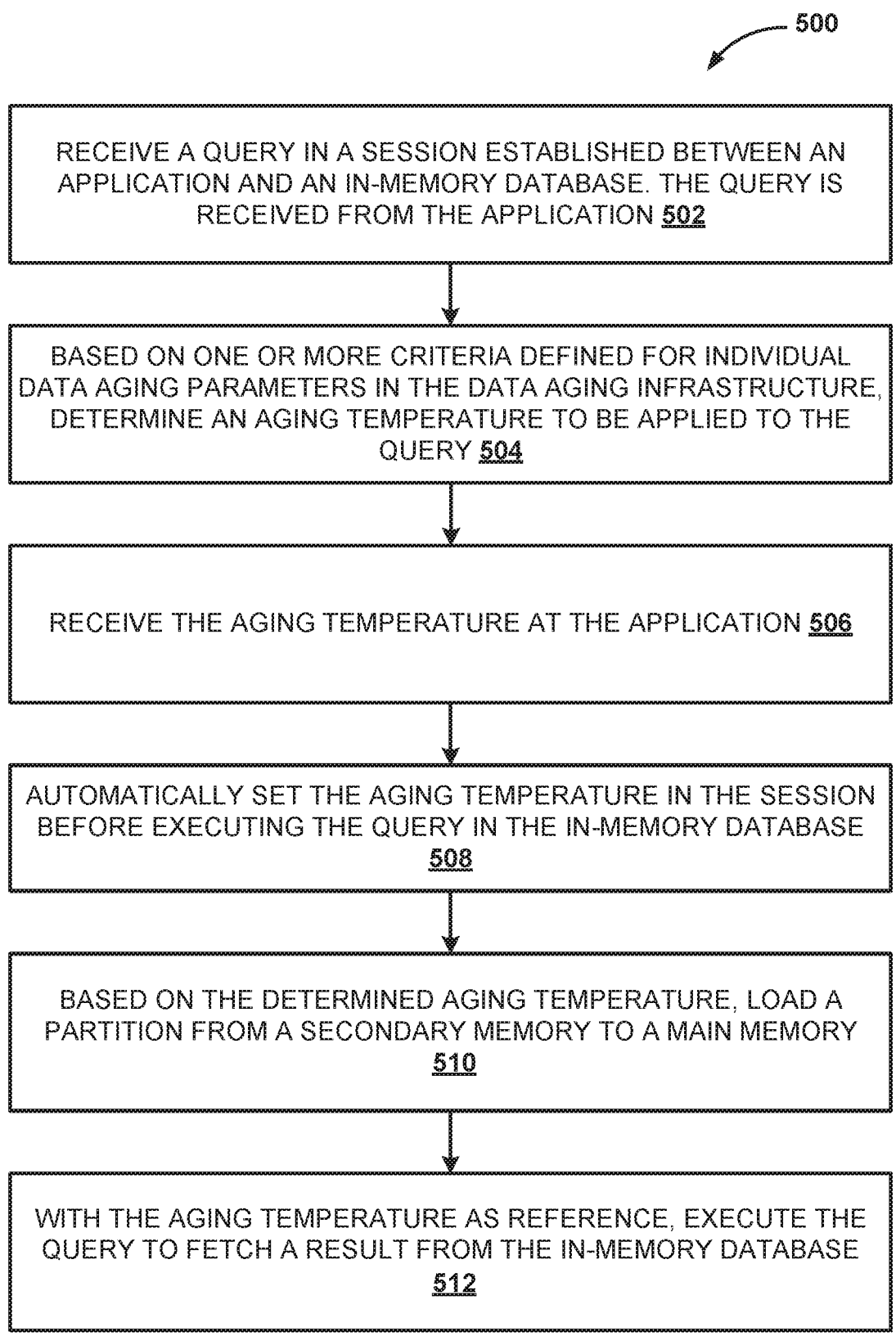
FIG. 5 is a flow chart illustrating process of data aging infrastructure for automatically determining aging temperature, according to one embodiment.

FIG. 5 is flow chart illustrating process 500 of data aging infrastructure for automatically determining aging temperature, according to one embodiment. At 502, a query is received in a session established between an application and an in-memory database. For example, as shown in FIG. 4, query Q3 is received in a session established between an application and an in-memory database. At 504, based on one or more criteria defined for individual data aging parameters in the data aging infrastructure, an aging temperature to be applied to the query is determined. For example, as shown in FIG. 4, data access router 402 in data aging infrastructure 404 receives the query Q3 to determine the aging temperature to be applied for the query Q3. At 506, the determined aging temperature is received at the application. For example, the determined aging temperature '09.01.2014' is received at the application. At 508, the aging temperature is automatically set in the session before executing the query in the in-memory database. Based on the determined aging temperature, at 510, a partition is loaded from a secondary memory to a main memory. For example, as explained in FIG. 4, a partition corresponding to the aging temperature '09.01.2014' is loaded into DRAM or main memory. At 512, with the aging temperature as reference, the query is executed to fetch a result from the in-memory database.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java. C++, or other object-oriented programming language and development tools. Another embodiment may be implemented in hard-wired circuitry in place of, or in combination with machine readable software instructions.

Figure 6:
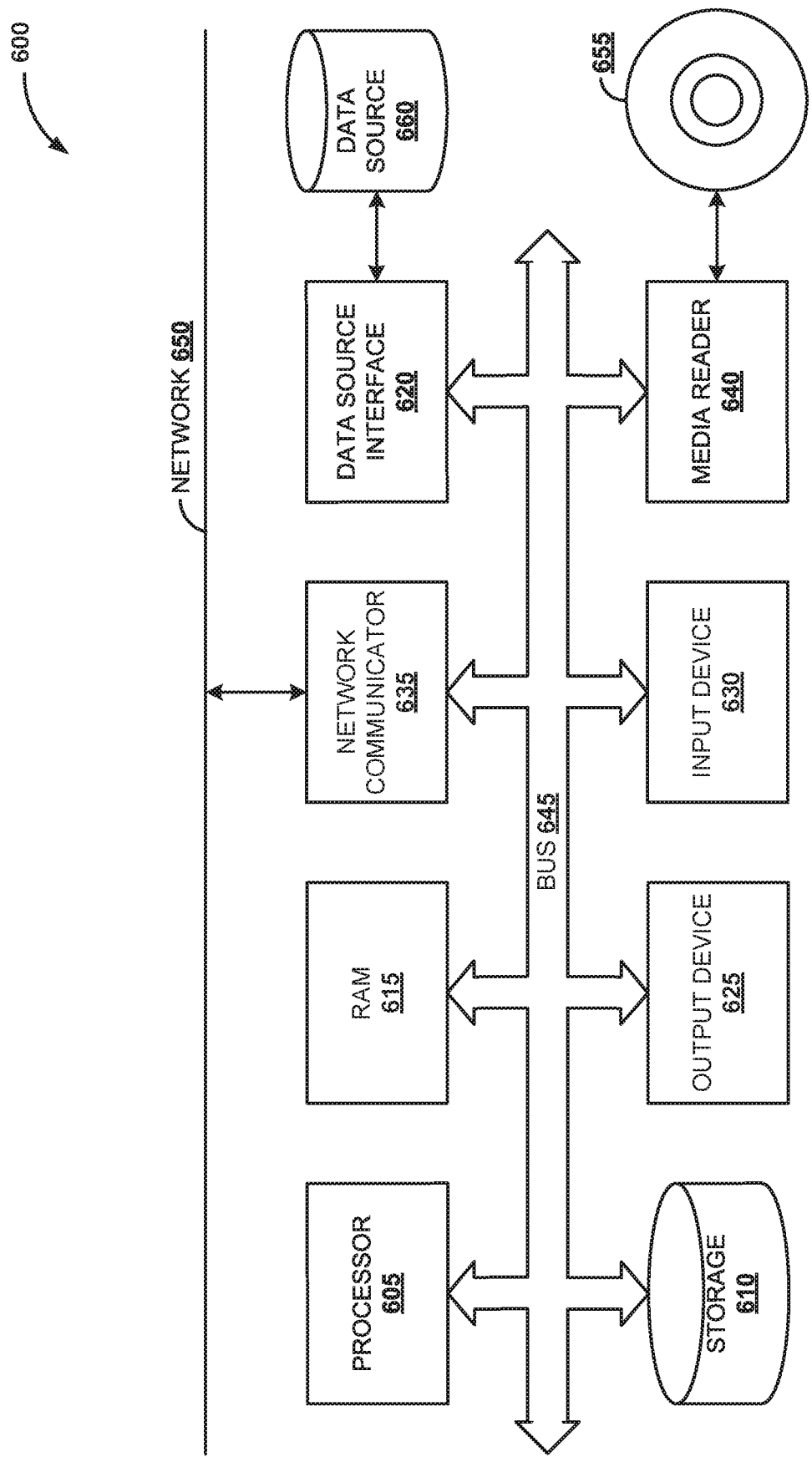
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
receiving a query in a session established between an application and an in-memory database, wherein the query is received from the application, and wherein the in-memory database is comprised in a main memory; and in response to receiving the query:
based on one or more criteria defined for individual data aging parameters, determining an aging temperature to be applied for the query, wherein the aging temperature specifies whether data associated with the query is assigned to the main memory associated with the in-memory database or to one of a plurality of partitions stored in a secondary memory separate from the main memory, and wherein each partition of the plurality of partitions stored in the secondary memory is associated with an aging temperature;
automatically setting the aging temperature in the session;
based on the determined aging temperature and a determination that at least a portion of the data associated with the query is stored in the secondary memory, loading at least one partition associated with the determined aging temperature from the secondary memory to the main memory; and
executing the query in the in-memory database based on data stored in the main memory after loading the at least one partition from the secondary memory to the main memory.

2. The non-transitory computer-readable medium of claim 1, wherein the data aging parameters comprises aging active parameter, aging statistics parameter, aging reference parameter, and aging rule parameter.

3. The non-transitory computer-readable medium of claim 2, wherein determining an aging temperature to be applied for the query comprises:
determining whether a table specified in the query is associated with a data aging object in the aging active parameter;
upon determining that the table is associated with the data aging object, determining a conditional clause received in the query as a reference date for determining the aging temperature;
matching other conditional clause received in the query with a criteria specified in the aging rule parameter; and
determining the aging temperature based on matching the other conditional clause.

4. The non-transitory computer-readable medium of claim 3, further comprises instructions which when executed by the computer further cause the computer to:
upon determining that the table is not associated with the data aging object, determine that the data aging is not performed on the table.

5. The non-transitory computer-readable medium of claim 1, wherein the secondary memory is hard disc storage and the main memory is a dynamic random access memory.

6. A computer-implemented method of automatically determining aging temperature, the method comprising:
in an in-memory database comprised in a main memory, receiving a query in a data access router in a data aging infrastructure; and
in response to receiving the query:
based on one or more criteria defined for individual data aging parameters in the data aging infrastructure, determining an aging temperature to be applied for the query, wherein the aging temperature specifies whether data associated with the query is assigned to the main memory associated with the in-memory database or to one of a plurality of partitions stored in a secondary memory separate from the main memory, and wherein each partition of the plurality of partitions stored in the secondary memory is associated with an aging temperature;
based on the determined aging temperature and a determination that at least a portion of the data associated with the query is stored in the secondary memory, loading at least one partition associated with the determined aging temperature from the secondary memory to the main memory; and
with the aging temperature as reference, executing the query to fetch a result from the in-memory database based on data stored in the main memory after loading the at least one partition from the secondary memory to the main memory.

7. The method of claim 6, further comprising:
receiving the query in a session established between an application and the in-memory database, wherein the query is received from the application;
receiving the aging temperature at the application; and
automatically setting the aging temperature in the session before executing the query in the in-memory database.

8. The method of claim 6, wherein the data aging parameters comprises aging active parameter, aging statistics parameter, aging reference parameter, and aging rule parameter.

9. The method of claim 8, wherein determining an aging temperature to be applied for the query comprises:
determining whether a table specified in the query is associated with a data aging object in the aging active parameter;
upon determining that the table is associated with the data aging object, determining a conditional clause received in the query as a reference date for determining the aging temperature;
matching other conditional clause received in the query with a criteria specified in the aging rule parameter; and
determining the aging temperature based on matching the other conditional clause.

10. The method of claim 9, further comprising:
upon determining that the table is not associated with the data aging object, determine that data aging is not performed on the table.

11. The method of claim 6, wherein the secondary memory is hard disc storage and the main memory is a dynamic random access memory.

12. A computer system for data aging infrastructure for automatically determining aging temperature, comprising:
a computer memory to store program code; and
a processor to execute the program code to perform operations comprising:
in an in-memory database comprised in a main memory, receiving a query in a data access router in a data aging infrastructure; and
in response to receiving the query:
determining whether a table specified in the query is associated with a data aging object;
upon determining that the table is associated with the data aging object, determining a conditional clause received in the query as a reference date for determining an aging temperature;
matching other conditional clause received in the query with a criteria specified in an aging rule parameter;
determining the aging temperature based on matching the other conditional clause, wherein the aging temperature specifies whether data associated with the query is assigned to the main memory associated with the in-memory database or to one of a plurality of partitions stored in a secondary memory separate from the main memory, and wherein each partition of the plurality of partitions stored in the secondary memory is associated with an aging temperature;

based on the determined aging temperature and a determination that at least a portion of the data associated with the query is stored in the secondary memory, loading at least one partition associated with the determined aging temperature from the secondary memory to the main memory; and based on the aging temperature, executing the query to fetch a result from the table in the in-memory database based on data stored in the main memory after loading the at least one partition from the secondary memory to the main memory.

13. The computer system of claim 12, wherein the processor further executes the program code to:

receive the query in a session established between an application and the in-memory database, wherein the query is received from the application;

receive the aging temperature at the application; and automatically set the aging temperature in the session before executing the query in the in-memory database.

14. The computer system of claim 12, wherein data aging parameters comprises aging active parameter, aging statistics parameter, aging reference info parameter, and aging rule parameter.

15. The computer system of claim 12, wherein the processor further executes the program code to:

upon determining that the table is not associated with the data aging object, determine data aging is not performed on the table.

* * * * *